(12) United States Patent
Pugh et al.

(10) Patent No.: US 10,675,793 B2
(45) Date of Patent: Jun. 9, 2020

(54) METHOD OF MANUFACTURING HYDROGEL OPHTHALMIC DEVICES WITH ELECTRONIC ELEMENTS

(71) Applicant: Johnson & Johnson Vision Care, Inc., Jacksonville, FL (US)

(72) Inventors: Randall Braxton Pugh, St. Johns, FL (US); Karson Putt, Lafayette, IN (US); Michael Ferran, Jacksonville, FL (US); Katherine Rowan Hardy, Jacksonville, FL (US); Daniel B. Otts, Fruit Cove, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 381 days.

(21) Appl. No.: 15/650,996

(22) Filed: Jul. 17, 2017

(65) Prior Publication Data

US 2017/0312947 A1    Nov. 2, 2017

Related U.S. Application Data

(62) Division of application No. 14/087,366, filed on Nov. 22, 2013.

(51) Int. Cl.
*B29C 43/02* (2006.01)
*B29D 11/00* (2006.01)
(Continued)

(52) U.S. Cl.
CPC .............. *B29C 43/02* (2013.01); *B29C 39/18* (2013.01); *B29D 11/00009* (2013.01);
(Continued)

(58) Field of Classification Search
CPC ..................................................... B29C 43/02
See application file for complete search history.

(56) References Cited

U.S. PATENT DOCUMENTS

| 6,217,171 B1 | 4/2001 | Auten |
| 9,427,920 B2 | 8/2016 | Pugh |

(Continued)

FOREIGN PATENT DOCUMENTS

| EP | 2631705 A1 | 8/2013 |
| RU | 2491034 C2 | 8/2013 |
| SG | 10201400602 A1 | 10/2014 |

OTHER PUBLICATIONS

Yao, H., et al., "A soft hydrogel contact lens with an encapsulated sensor for tear glucose monitoring," in *Micro Electro Mechanical Systems (MEMS), 2012 IEEE 25th International Conference on*, vol., no., pp. 769-772, Jan. 29, 2012-Feb. 2, 2012.

(Continued)

*Primary Examiner* — Larry W Thrower

(57) ABSTRACT

The present invention provides methods for forming an ophthalmic lens that can include a media insert and/or electronic components. In particular, the present disclosure provides for adhesion promoting functionalization steps for a biocompatible coating to bind a hydrogel material to a plastic surface or electronic component prior to the polymerization of the hydrogel. In some aspects, the media insert can be used to contain energy sources and/or functional electronic components which may be, for example, in a stacked integrated component configuration to permit a generally arcuate shape that can conform to the anterior surface of an eye.

11 Claims, 8 Drawing Sheets

(51) Int. Cl.
  *B29C 39/18* (2006.01)
  *B29K 83/00* (2006.01)
  *B29L 11/00* (2006.01)
(52) U.S. Cl.
  CPC .. *B29D 11/00125* (2013.01); *B29D 11/00807* (2013.01); *B29K 2083/00* (2013.01); *B29L 2011/0041* (2013.01)

(56) References Cited

U.S. PATENT DOCUMENTS

| 2009/0206498 | A1 | 8/2009 | Tepedino, Jr. |
| 2010/0028559 | A1 | 2/2010 | Yan |
| 2010/0072643 | A1 | 3/2010 | Pugh |
| 2010/0079724 | A1 | 4/2010 | Pugh et al. |
| 2010/0110372 | A1 | 5/2010 | Pugh |
| 2012/0199995 | A1 | 8/2012 | Pugh |
| 2012/0218508 | A1 | 8/2012 | Pugh et al. |
| 2012/0235277 | A1 | 9/2012 | Pugh |
| 2014/0120242 | A1 | 5/2014 | Wang |

OTHER PUBLICATIONS

D. Zeniieh, "Parylene-C Thin Film for Biocompatible Encapsulations with Very Strong Adhesion and Superior Barrier Properties", *21st International Symposium on Plasma Chemistry (ISPC 21)*, Aug. 9, 2013, Cairns Convention Centre, Queensland, Australia.
T. Stieglitz et al., "Encapsulation of Flexible Biomedical Microimplants with Parylene C", *7th Annual Conference of the International Functional Electrical Stimulation Society*, Jun. 2002.
Dr. Tristan T Tapper, Plasma Basics, 2007, Webpage https://www.artoptial.com/storage/docs/Plasma_basics.pdf.
Plasma Surface Technology and Contact Lenses—When and Why?, citation not enclosed due to copyright restrictions. A copy may be accessed from sss.woehlk.com.hr/pdf/woehld-wissen-03-en.pdf.
S. Horn, et al., Diamond-MT's Blog—"How to Improve Parylene Adhesion", Mar. 28, 2012 Webpage http://www.paryleneconformalcoating.com/.

METHOD OF MANUFACTURING HYDROGEL OPHTHALMIC DEVICES WITH ELECTRONIC ELEMENTS

CROSS REFERENCE TO RELATED APPLICATION

The present application is a divisional application of U.S. patent application Ser. No. 14/087,366 filed on Nov. 22, 2013.

FIELD OF USE

The present invention relates to methods and apparatus related to the manufacturing of energized ophthalmic devices and, more specifically, in some embodiments, the sealing and encapsulation manufacturing aspects for the electronic components of an energized hydrogel contact lens.

BACKGROUND OF THE INVENTION

Traditionally, an ophthalmic device, such as a contact lens or an intraocular lens, included a biocompatible device with a corrective, cosmetic, or therapeutic quality. A contact lens, for example, can provide one or more of vision-correcting functionality, cosmetic enhancement, and therapeutic effects. The physical characteristics of the contact lens provide each function. A design incorporating a refractive quality into contact lens can provide a vision-corrective function. A pigment incorporated into the contact lens can provide a cosmetic enhancement. An active agent incorporated into a contact lens can provide a therapeutic functionality.

Contact lenses are routinely placed right onto the surface of the eye. While rigid lenses have been around longer, soft hydrogel lenses can provide greater comfort and oxygen permeability. Soft hydrogel lenses can be manufactured using different techniques including, for example, injection molding to create highly precise lenses. During manufacturing techniques that use molds, the hydrogel contact lenses must come off the molds carefully to prevent deformation and/or tearing of the hydrogel. One way of achieving this has been with coatings and chemicals that can facilitate the removal by preventing adhesion of the hydrogel contact lens to the mold piece(s).

Novel energized ophthalmic devices, including contact lenses, have recently been described and are in development. Different designs for these energized ophthalmic devices provide that the ophthalmic device can include an energy source and various electronic components, among other components, for various functionality. In some designs, energy sources and/or electronic components can be included in a rigid insert that can be placed on a hydrogel skirt or embedded in hydrogel. These designs, however, require that the rigid insert and/or electronic component actually adhere to the hydrogel. As a result of the foregoing, new methods of manufacturing ophthalmic devices that can promote the adhesion of rigid inserts and/or electronic components to hydrogel portions are desired.

SUMMARY

The foregoing needs are met, to a great extent, by the present invention, wherein in one aspect methods of manufacturing an energized ophthalmic device that include steps to promote the controlled adhesion of a rigid insert or medial insert, and/or electronic elements, to a hydrogel portion are disclosed.

According to some aspects of the disclosure, a method of forming an energized ophthalmic device is disclosed. In particular, the method including: pre-dosing a first mold part with a pre-dose amount of a reactive monomer mixture; functionalizing a media insert so that an adhesion promoter can bind to a surface of said media insert; applying an adhesion promoter to the functionalized media insert; coating said media insert including the adhesion promoter; placing the media insert on said pre-dose of reactive monomer mixture; pre-curing the pre-dosed reactive monomer mixture to fixedly hold the media insert proximate to the first mold part; post-dosing the first mold part with a post-dose of a reactive monomer mixture; placing a second mold part proximate to the first mold part, wherein the placing forms a ophthalmic device mold assembly with a lens forming cavity; and curing at least the post-dosed reactive monomer mixture to form the ophthalmic lens.

According to other aspects of the disclosure, the method can include: pre-dosing a first mold part with a pre-dose amount of a reactive monomer mixture; functionalizing an electronic element so that an adhesion promoter can bind to a surface of said electronic element; applying an adhesion promoter to the functionalized electronic element; coating the electronic element including the adhesion promoter; placing the electronic element on the pre-dose of reactive monomer mixture; pre-curing the pre-dosed reactive monomer mixture to fixedly hold the electronic element proximate to the first mold part; post-dosing the first mold part with a post-dose of a reactive monomer mixture; placing a second mold part proximate to the first mold part, wherein the placing forms an ophthalmic device mold assembly with a lens forming cavity; and curing at least the post-dosed reactive monomer mixture to form the energized ophthalmic lens.

In yet additional aspects, the method can include: functionalizing an electronic element so that an adhesion promoter can bind to a surface of said electronic element; applying an adhesion promoter to the functionalized electronic element; coating said electronic element including the adhesion promoter with a parylene layer; and fixing said coated electronic element in a hydrogel ophthalmic device.

DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE INVENTION

Figure 1A:
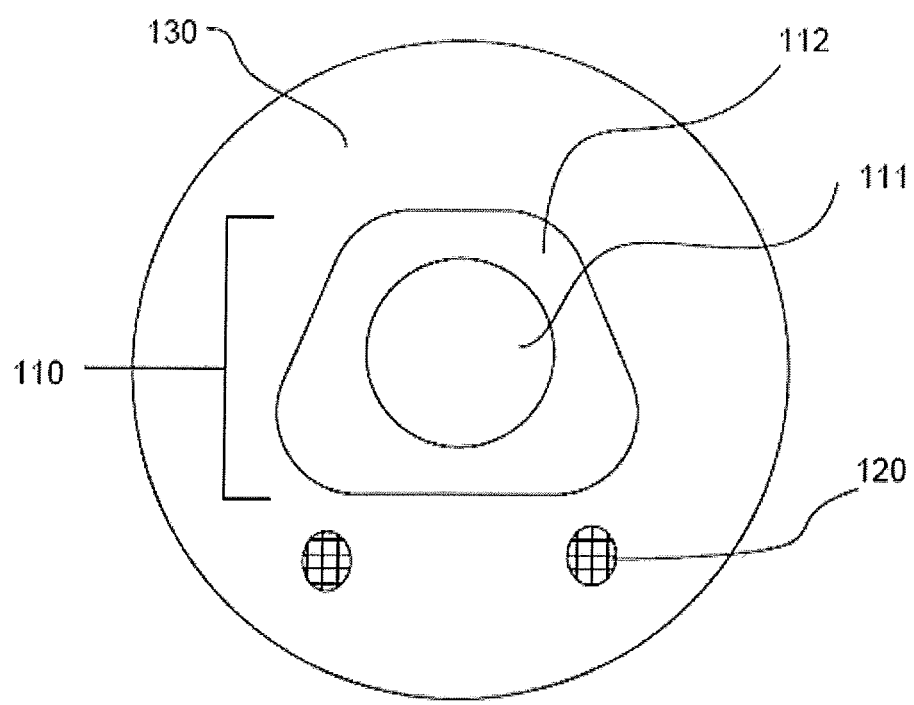
FIG. 1A illustrates the top view of an exemplary ophthalmic device with a fully encapsulated media insert and electronic elements according to some aspects of the present disclosure.

The disclosure will now be described with reference to the drawing figures, in which like reference numerals refer to like parts throughout.

Various aspects of the ophthalmic device and method disclosed may be illustrated by describing components that are coupled, sealed, attached, and/or joined together. As used herein, the terms "coupled," "sealed," "attached," and/or "joined" are used to indicate either a direct connection between two components or, where appropriate, an indirect connection to one another through intervening or intermediate components. In contrast, when a component is referred to as being "directly coupled," "directly sealed," "directly attached," and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations in addition to the orientation depicted in the drawings. By way of example, if aspects of an exemplary ophthalmic device shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of an ophthalmic device with an intraocular pressure monitoring system may be illustrated with reference to one or more exemplary embodiments. As used herein, the term "exemplary" means "serving as an example, instance, or illustration," and should not necessarily be construed as preferred or advantageous over other embodiments disclosed herein.

The present invention includes methods and apparatus for manufacturing energized ophthalmic devices. In particular, an energized ophthalmic devices including a contact lens with electronic components, and in some embodiments, a media insert. In addition, the present invention includes methods of coating the media insert and electronic elements for the incorporation in hydrogel ophthalmic devices.

In the following sections, detailed descriptions of embodiments of the invention will be given. The description of both preferred and alternative embodiments are exemplary embodiments only, and it is understood that to those skilled in the art that variations, modifications, and alterations may be apparent. It is therefore to be understood that said exemplary embodiments do not limit the scope of the underlying invention.

Glossary

In this description and claims directed to the presented invention, various terms may be used for which the following definitions will apply:

Adhesion Promotion: as used herein refers to a process that increases the adhesive tendencies between two surfaces, such as, for example, between a media insert/electronic component and an encapsulant.

Back Curve Piece or Back Insert Piece: as used herein refers to a solid element of a multi-piece rigid insert that, when assembled into the said insert, will occupy a location on the side of the ophthalmic lens that is on the back. In an ophthalmic device, such a piece would be located on the side of the insert that would be closer to the wearer's eye surface. In some embodiments, the back curve piece may contain and include a region in the center of an ophthalmic device through which light may proceed into the wearer's eye. This region may be called an optical zone. In other embodiments, the piece may take an annular shape where it does not contain or include some or all of the regions in an optical zone. In some embodiments of an ophthalmic insert, there may be multiple back curve pieces, and one of them may include the optical zone, while others may be annular or portions of an annulus.

Component: as used herein refers to a device capable of drawing electrical current from an energy source to perform one or more of a change of logical state or physical state.

Encapsulate: as used herein refers to creating a barrier to separate an entity, such as, for example, a media insert, from an environment adjacent to the entity.

Encapsulant: as used herein refers to a layer formed surrounding an entity, such as, for example, a media insert, that creates a barrier to separate the entity from an environment adjacent to the entity. For example, encapsulants may be comprised of silicone hydrogels, such as Etafilcon, Galyfilcon, Narafilcon, and Senofilcon, or other hydrogel contact lens material. In some embodiments, an encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to a device capable of supplying energy or placing a biomedical device in an energized state.

Energy Harvesters: as used herein refers to device capable of extracting energy from the environment and convert it to electrical energy.

Front Curve Piece or Front Insert Piece: as used herein refers to a solid element of a multi-piece rigid insert that, when assembled into the said insert, will occupy a location on the side of the ophthalmic lens that is on the front. In an ophthalmic device, such a piece would be located on the side of the insert that would be further from the wearer's eye surface. In some embodiments, the piece may contain and include a region in the center of an ophthalmic device through which light may proceed into the wearer's eye. This region may be called an optical zone. In other embodiments, the piece may take an annular shape where it does not contain or include some or all of the regions in an optical zone. In some embodiments of an ophthalmic insert, there may be multiple front curve pieces, and one of them may include the optical zone, while others may be annular or portions of an annulus.

Lens-Forming Mixture or Reactive Mixture or Reactive Monomer Mixture (RMM): as used herein refers to a monomer or prepolymer material that can be cured and crosslinked or crosslinked to form an ophthalmic lens. Various embodiments may include lens-forming mixtures with one or more additives such as, for example, UV blockers, tints, photoinitiators or catalysts, and other additives useful in ophthalmic lenses such as contact or intraocular lenses.

Lens-Forming Surface: as used herein refers to a surface that is used to mold an ophthalmic lens. In some embodiments, any such surface can have an optical quality surface finish, which indicates that it is sufficiently smooth and formed so that an ophthalmic lens surface fashioned by the polymerization of a lens-forming mixture in contact with the molding surface is optically acceptable. Further, in some embodiments, the lens-forming surface can have a geometry that is necessary to impart to the ophthalmic lens surface the desired optical characteristics, including without limitation, spherical, aspherical and cylinder power, wave front aberration correction, corneal topography correction, or combinations thereof.

Lithium Ion Cell: as used herein refers to an electrochemical cell where lithium ions move through the cell to generate electrical energy. This electrochemical cell, typically called a battery, may be reenergized or recharged in its typical forms.

Media Insert: as used herein refers to an encapsulated insert that will be included in an energized ophthalmic device. The energization elements and circuitry may be embedded in the media insert. The media insert defines the primary purpose of the energized ophthalmic device. For example, in embodiments where the energized ophthalmic device allows the user to adjust the optic power, the media insert may include energization elements that control a liquid meniscus portion in the optical zone. Alternatively, a media insert may be annular so that the optical zone is void of material. In such embodiments, the energized function of the lens may not be optic quality but may be, for example, monitoring glucose or administering medicine.

Mold: as used herein refers to a rigid or semi-rigid object that may be used to form ophthalmic lenses from uncured formulations. Some preferred molds include two mold parts forming a front curve mold and a back curve mold (i.e., mold assembly).

Ophthalmic Lens or Ophthalmic Device or Lens: as used herein refers to any device that resides in or on the eye. The device may provide optical correction, may be cosmetic, or provide some functionality unrelated to optic quality. For example, the term lens may refer to a contact lens, intraocular lens, overlay lens, ocular insert, optical insert, or other similar device through which vision is corrected or modified, or through which eye physiology is cosmetically enhanced (e.g. iris color) without impeding vision. Alternatively, lens may refer to a device that may be placed on the eye with a function other than vision correction, such as, for example, monitoring of a constituent of tear fluid or means of administering an active agent. In some embodiments, the preferred lenses of the invention may be soft contact lenses that are made from silicone elastomers or hydrogels, which may include, for example, silicone hydrogels and fluorohydrogels.

Optic Zone: as used herein refers to an area of an ophthalmic lens through which a wearer of the ophthalmic lens sees.

Power: as used herein refers to work done or energy transferred per unit of time.

Pre-cure: as used herein refers to a process that partially cures a mixture. In some embodiments, a pre-curing process may comprise a shortened period of the full curing process. Alternatively, the pre-curing process may comprise a unique process, for example, by exposing the mixture to different temperatures and wavelengths of light than may be used to fully cure the material.

Pre-dose: as used herein refers to the initial deposition of material in a quantity that is less than the full amount that may be necessary for the completion of the process. For example, a pre-dose may include a quarter of the necessary substance.

Post-dose: as used herein refers to a deposition of material in the remaining quantity, after the pre-dose, that may be necessary for the completion of the process. For example, where the pre-dose includes a quarter of the necessary substance, a subsequent post-dose may provide the remaining three quarters of the substance.

Rechargeable or Reenergizable: as used herein refers to a capability of being restored to a state with higher capacity to do work. Many uses within this invention may relate to the capability of being restored to a state with the ability to flow electrical current at a certain rate for a certain, reestablished time period.

Recharge or Reenergize: as used herein refers to an act of restoring to a state with higher capacity to do work. Many uses within this invention may relate to restoring a device to a state with the capability to flow electrical current at a certain rate for a certain, reestablished time period.

Released from a Mold: as used herein refers to an act where an ophthalmic lens is either completely separated from the mold or is only loosely attached so that it can be removed with mild agitation or pushed off with a swab.

Stacked Integrated Component Devices (SIC-Devices): as used herein refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device-production technologies to fit and assume various contours.

Ophthalmic Device

Referring now to FIG. 1A, the top view of an exemplary ophthalmic device 100 with a fully encapsulated media insert 110 and electronic elements 120 according to some aspects of the present disclosure is depicted. In particular, the exemplary ophthalmic device 100 can include a media insert 110 encapsulating energization elements and functional elements including, for example, a variable focus lens. In some embodiments, energization elements may generally be located on an area in the periphery 112 of the media insert 110 and functional optical elements located in the middle 111 of the media insert 110.

Electrical components including, for example, a processor, micro-photonic elements, a transducer, and/or sensors, may be included either inside the media insert of on a hydrogel portion 130 of the ophthalmic device 100. For example, electronic elements 120 may be located in/on the hydrogel portion 130 and may be, for example, sensors, and/or transducers used for diagnostics, drug delivery, or communication.

In some embodiments, the media insert may be formed by thermoforming an aligned and held sheet into a three-dimensional shape that may replicates the surface of a thermoformed mold piece. The resulting piece may be cut from the thin sheet of material which may be functionalized and/or coated thereafter to form the media insert and encapsulate electronic elements, functional elements and/or energization elements. During the process of cutting out insert pieces from thermoforming material, alignment features may be cut into the insert piece such as notches, grooves, or flats, for example. These alignment features may be used to align the insert piece or formed ophthalmic media inserts in subsequent processing.

Figure 1B:
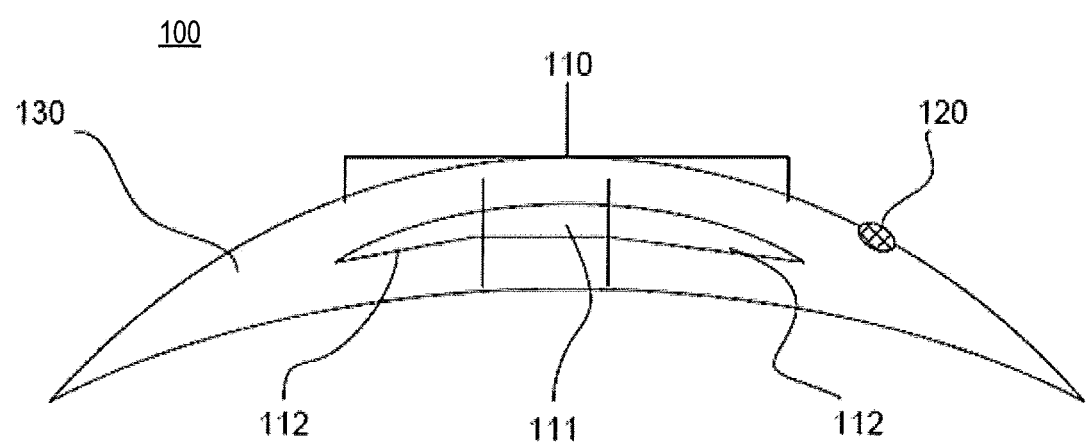
FIG. 1B illustrates a cross section of the exemplary ophthalmic device of FIG. 1A according to some aspects of the present disclosure.

Referring now to FIG. 1B, a cross section of the exemplary ophthalmic device 100 of FIG. 1A according to some aspects of the present disclosure is depicted. In particular, the exemplary ophthalmic device 100 includes a media insert 110 that is fully encapsulated by a hydrogel portion 130 to thereby prevent direct contact of the media insert 110 with the eye of a user. Accordingly, in some embodiments, the media insert 110 may be generally rigid and comprise a variety of materials, wherein the materials may not be biocompatible. In some embodiments, however, the media insert 110 may include a biocompatible coating that can provide additional protection from non-biocompatible materials. Further, in some embodiments the back curve surface may be coated with a different material than the front curve surface of the media insert 110. This may allow gases emitted by components contained inside the media insert to escape the media insert 110, for example.

Electronic components 120 may also be coated and included outside of the media insert 110, in the periphery of the hydrogel portion 130. These components may include, for example, drug delivery components, ocular fluid sensors, micro-electromechanical transducers, etc. Aside from providing a biocompatible layer of protection, the coatings may be used to promote adhesion of the hydrogel to the electronic components 120.

In some embodiments, the media insert 110 may include a printed pattern that may add cosmetic functionality, including a concealment of the zones 111-113 on the media insert 110. In some embodiments, the media insert 110 may include an active agent that may dissolve when the ophthalmic lens 100 is placed on the eye. Embodiments where the active agent is a medicament may be particularly significant where the astigmatism is caused by damage to the eye.

Proceeding to FIG. 2A-2E, exemplary processing steps for forming an ophthalmic lens 209 with a media insert 204 and/or electronic components, wherein the media insert 204 can be encapsulated/coated with an adhesion promoter that can help the hydrogel bind to the surfaces of the media insert and/or electronic components are generally depicted. Exemplary materials and curing specifications are included in Table 1, but other materials and polymerization techniques may be apparent and are within the scope of the described inventive art. Specific method steps and exemplary techniques are described in detail in subsequent sections of this disclosure.

Figure 2A:
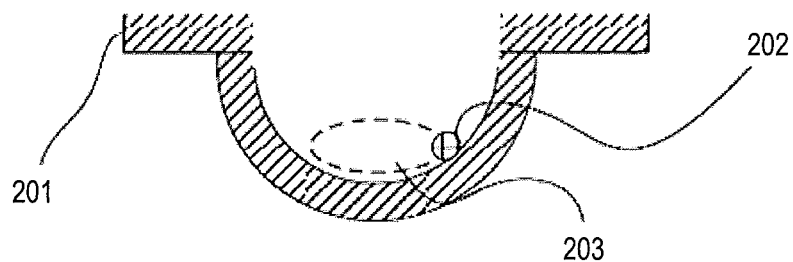
FIG. 2A illustrates a cross section of an exemplary front curve mold part with a pre-dose of monomer and an electronic element deposited thereon according to aspects of the present disclosure.

Referring now to FIG. 2A, a cross section of an exemplary front curve mold piece 201 with a pre-dose of monomer 203 and an electronic element 202 deposited thereon according to aspects of the present disclosure is depicted. At 210, a pre-dose of reactive monomer mixture 203 may be deposited onto a lens forming surface of a front curve mold piece 201. In some embodiments, one or more electronic component(s) 202 may be located on the front curve mold piece 201 or on the pre-dosed RMM 203. The electronic component(s) 202 may be coated or include a surface treatment that promotes its adhesion to the RRM 203.

Figure 2B:
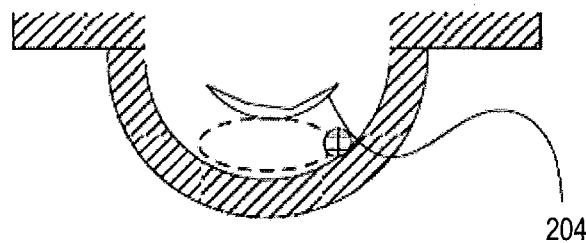
FIG. 2B illustrates a cross section of the exemplary front curve mold part of FIG. 1A with a media insert additionally positioned thereon according to aspects of the present disclosure.

Referring now to FIG. 2B, a cross section of the exemplary front curve mold piece 201 of FIG. 2A with a media insert 204 additionally being positioned thereon according to aspects of the present disclosure is illustrated. At 220, a media insert 204 may be placed proximate to the front curve mold piece 204 and in contact with the pre-dosed RMM 203. In embodiments where the electronic component 202 is contained outside of the media insert 204, the media insert 204 may be aligned and in electrical connection with the electronic component 202. In some embodiments, the electrical connection can be achieved through the use of electrical interconnects (not shown), conductive coating materials, and/or hydrogels. In some embodiments, the transmission may be used, for example, to Energize the electronic component 202 and/or the transmission of data therebetween.

Figure 2C:
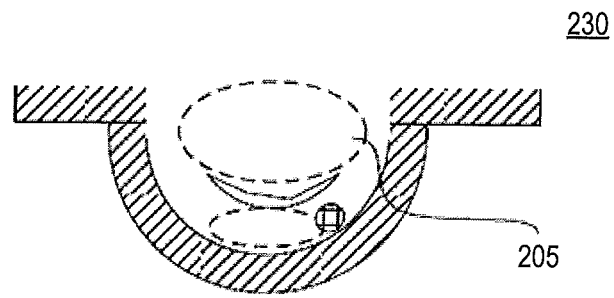
FIG. 2C illustrates a cross section of the exemplary front curve mold part of FIG. 1B with a post-dose of monomer deposited thereon according to aspects of the present disclosure.

Referring now to FIG. 2C, a cross section of the exemplary front curve mold piece 201 of FIG. 2B with a post-dose of reactive forming mixture 205 being deposited thereon according to aspects of the present disclosure is depicted. In particular, at 230 the front curve mold piece 201 containing the media insert 204 and the electronic component 202 may be post-dosed with additional reactive monomer mixture 205. The volume of the pre-dose reactive monomer mixture 203 and the volume of the post-dose reactive monomer mixture 205 which may fully encapsulate the rigid insert 204 according to some embodiments.

Figure 2D:
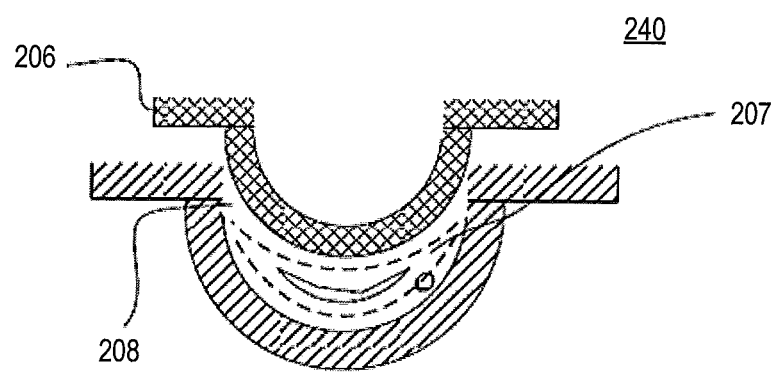
FIG. 2D illustrates a cross section of the exemplary front curve mold part of FIG. 1C and a corresponding front curve mold part being positioned to form the mold assembly according to aspects of the present disclosure.

Referring now to FIG. 2D, a cross section of the exemplary front curve mold piece of FIG. 2C and a corresponding back curve mold piece 206 being positioned to form the mold assembly according to aspects of the present disclosure is depicted. In particular, at 240, the back curve mold piece 206 may be placed proximate to the front curve mold 201, wherein the front curve mold piece 201 and the back curve mold piece 206 may form a lens-forming cavity 208. The lens-forming cavity 208 may combine and mold the post-dosed RMM 205 and pre-dosed RMM 203, which in some embodiments may allow the hydrogel RMM 207 to fully encapsulate the rigid insert 204. The hydrogel RMM 207 may adhere to or at least partially encapsulate the electronic component(s) 203.

Figure 2E:
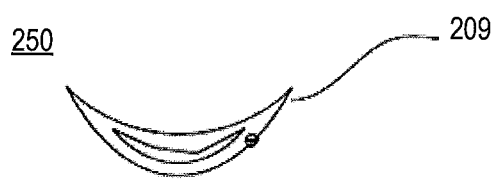
FIG. 2E illustrates a formed exemplary ophthalmic device with a media insert encapsulated by the hydrogel according to aspects of the present disclosure.

Referring now to FIG. 2E, a cross section of a formed ophthalmic device 209, 100 containing a media insert 204 and an electronic component 202 according to aspects of the disclosure is depicted. In particular, at 250, the ophthalmic device 209 is shown subsequently to the hydrogel RRM 207 being polymerized and the ophthalmic device 209 is released from the mold assembly. Polymerization of the hydrogel RRM 207 may be achieved through a curing process using radiation, for example.

TABLE 1

Partial Listing of exemplary sealing materials, encapsulating materials and coating materials

| Material | Exemplary aspects of utility |
|---|---|
| Epoxy Systems | One Component - high temp cure, excellent adhesive, biocompatible |
| | Two Component - fast cure at ambient, biocompatibility, gap filling |
| Silicone Systems | One Component - resistance to humidity, high flexibility, Insulation, Optical Clarity |
| | Two Component - Strength, Superior Flexibility, biocompatibility |
| UV Curable Systems | Fast Cure, grades with Flexibility, vapor free |
| LED Curable Systems | One Component, Low Temperature applications |
| Polyurethanes | Optical Clarity, Insulation, Flexibility |
| Polysulfides | Underwater cure, high Strength, high chem resistance |
| Cyanoacrylates | Biocompatibility, single compound, no outgassing |
| Elastomeric Systems | Excellent water resistance, Insulation, single compound |
| Film Adhesives | Preform-ability, excellent insulation characteristics |
| Hot Melt Systems | Food Contact Grades |
| Latex Systems | Pressure Sensitive Applications, Food Contact Grades |
| Polyimides | Photosensitive, Preform-ability, Flexibility |
| Parylenes (Vapor Phase Film Dep) | Surface Treatment, Insulation, Conformal Application |

Media insert 204 and/or electronic component(s) 203 may be formed from materials that may or may not be stable in the environments that ophthalmic devices occupy, including, for example, the tear fluid on an ocular surface that contacts the media insert 204/electronic component(s) 203. Accordingly, encapsulation layers formed using coatings, including, for example, a parylene family including, but not limited to, the parylene C, N, and D family elements is desired. In some embodiments, the encapsulation coating may occur before or after application of other adhesive or sealant layers and the material may serve as an adhesion promoter for the hydrogel and the Medial Insert 204/electronic component(s) 203.

Methods and Materials for Insert Based Ophthalmic Lenses

Referring back to FIG. 2A-2E, exemplary processing steps that may take place for forming an ophthalmic lens 209 with a media insert 204, and wherein the media insert 204 can be encapsulated are illustrated. As used herein, a mold assembly formed by 201, 206 may include a plastic formed to shape a lens-forming cavity 208 into which a lens-forming mixture 207 may be dispensed, and, upon reaction or cure of the lens-forming mixture 207, an ophthalmic lens 209 of a desired shape is produced. The combination of mold parts 201, 206 is preferably temporary, wherein, upon formation of the ophthalmic lens 209, the mold parts 201, 206 may be separated for removal, at 250, of the ophthalmic lens 209.

At least one mold piece 201, 206 may have at least a portion of its surface in contact with the lens-forming mixture 207 so that upon reaction or cure of the lens-forming mixture 207 the surface provides a desired optical shape and form to the portion of the ophthalmic lens 209 with which it is in contact. The same is true of at least one other mold piece, e.g. 201, 206.

Thus, for example, in an exemplary embodiment a mold assembly 201, 206 can be formed from two parts 201, 206, a female concave piece (front curve mold) 201 and a male convex piece (back curve mold) 206 with a cavity 208 formed between them. The portion of the concave surface that makes contact with a lens-forming mixture 207 has the curvature of the front curve of an ophthalmic lens 209.

The portion is sufficiently smooth and formed such that the surface of an ophthalmic lens 209, formed by polymerization of the lens-forming mixture 207 that is in contact with the concave surface, is optically acceptable. In some embodiments, the front curve mold 201 may also have an annular flange integral to and surrounding a circular circumferential edge that extends from the front curve mold 201 in a plane normal to the axis and also extends from the flange (not shown).

A lens-forming surface can include a surface with an optical-quality surface finish, which indicates that it is sufficiently smooth and formed so that an ophthalmic lens surface fashioned by the polymerization of a lens-forming mixture 208 in contact with the molding surface is optically acceptable. Further, in some embodiments, the lens-forming surfaces of the mold pieces 201, 206 may have a geometry that is necessary to impart to the ophthalmic lens surface the desired optical characteristics, including, but not limited to, spherical, aspherical, and cylinder power; wave front aberration correction; corneal topography correction; and combinations thereof. One ordinarily skilled in the art will recognize that characteristics other than those discussed may also be included within the scope of the invention.

The media insert 204 may be manufactured, for example, using microinjection molding technology. Embodiments can include, for example, a poly(4-methylpent-1-ene) copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 radius. One exemplary micromolding machine can include the Microsystem 50 five-ton system offered by Battenfield Inc. Some or all of the sealing features, including, but not limited to, grooves, slots, lips, and knife edges may be formed during the molding process or formed later by subsequent processing of the result of the molding process.

As previously described, the media insert 204 may be placed in a mold piece 201, 206 utilized to form an ophthalmic lens 209. mold piece(s)'s 201, 206 material can include, for example, a polyolefin of one or more of the following: polypropylene, polystyrene, polyethylene, polymethyl methacrylate, and modified polyolefins. Other molds can include a ceramic or metallic material.

Other mold materials that may be combined with one or more additives to form an ophthalmic lens mold include, for example, Zieglar-Natta polypropylene resins (sometimes referred to as znPP); a clarified random copolymer for clean molding as per FDA regulation 21 CFR (c) 3.2; a random copolymer (znPP) with ethylene group.

Still further, in some embodiments, the molds of the invention may contain polymers such as polypropylene, polyethylene, polystyrene, polymethyl methacrylate, modified polyolefins containing an alicyclic moiety in the main chain, and cyclic polyolefins. This blend can be used on either or both mold halves. Preferably, this blend is used on the back curve, and the front curve consists of the alicyclic co-polymers.

In some embodiments and according to aspects of the disclosure, molds 200 can be made using injection molding according to known techniques. Additional embodiments however, may also include molds fashioned by other techniques including, for example, lathing, diamond turning, or laser cutting.

Typically, ophthalmic lenses are formed on at least one surface of both mold piece(s) 201 and 202. However, in some embodiments, one surface of an ophthalmic lens may be formed from a mold piece 201 and 202, and another surface of an ophthalmic lens can be formed, for example, using a lathing method, a free form method, or the like.

In some embodiments, an ophthalmic lens hydrogel RRM type can include a silicone-containing component. A silicone-containing component is one that contains at least one [—Si—O—] unit in a monomer, macromer, or prepolymer. Preferably, the total silicone and attached oxygen are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the ophthalmic lens skirt, also called an insert encapsulating layer, that surrounds the insert may be comprised of standard hydrogel ophthalmic lens formulations. Exemplary materials with characteristics that may provide an acceptable match to numerous insert materials may include, but are not limited to, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone-containing components include compounds of Formula I

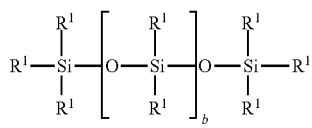

wherein $R^1$ is independently selected from monovalent reactive groups, monovalent alkyl groups, or monovalent aryl groups, any of which may further comprise functionality selected from hydroxy, amino, oxa, carboxy, alkyl carboxy, alkoxy, amido, carbamate, carbonate, halogen or combinations thereof; monovalent siloxane chains comprising 1-100 Si—O repeat units that may further comprise functionality selected from alkyl, hydroxy, amino, oxa, carboxy, alkyl carboxy, alkoxy, amido, carbamate, halogen, or combinations thereof;

where b is 0 to 500, where it is understood that when b is other than 0, b is a distribution having a mode equal to a stated value;

wherein at least one $R^1$ comprises a monovalent reactive group and, in some embodiments, between one and three $R^1$ comprise monovalent reactive groups.

As used herein, monovalent reactive groups are groups that can undergo free radical and/or cationic polymerization. Non-limiting examples of free radical reactive groups include (meth)acrylates, styryls, vinyls, vinyl ethers, $C_{1-6}$ alkyl(meth)acrylates, (meth)acrylamides, $C_{1-6}$ alkyl(meth)acrylamides, N-vinyllactams, N-vinylamides, $C_{2-12}$ alkenyls, $C_{2-12}$ alkenylphenyls, $C_{2-12}$ alkenylnaphthyls, $C_{2-6}$ alkenylphenyl $C_{1-6}$ alkyls, O-vinylcarbamates, and O-vinylcarbonates. Non-limiting examples of cationic reactive groups include vinyl ethers or epoxide groups and mixtures thereof. In one embodiment the free radical reactive groups comprise (meth)acrylate, acryloxy, (meth)acrylamide, and mixtures thereof.

Suitable monovalent alkyl and aryl groups include unsubstituted monovalent $C_{1-16}$ alkyl groups, $C_{6-14}$ aryl groups, such as substituted and unsubstituted methyl, ethyl, propyl, butyl, 2-hydroxypropyl, propoxypropyl, polyethyleneoxypropyl, combinations thereof, and the like.

In one embodiment b is 0, one $R^1$ is a monovalent reactive group, and at least three $R^1$ are selected from monovalent alkyl groups having 1 to 16 carbon atoms or, in another embodiment, from monovalent alkyl groups having 1 to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or, in some embodiments, 3 to 10; at least one terminal $R^1$ comprises a monovalent reactive group and the remaining $R_1$ are selected from monovalent alkyl groups having 1 to 16 carbon atoms or, in another embodiment, from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms, and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), and monomethacryloxypropyl terminated mono-n-butyl terminated polydimethylsiloxanes (800-1000 MW) (mPDMS).

In another embodiment, b is 5 to 400 or from 10 to 300, both terminal $R^1$ comprise monovalent reactive groups, and the remaining $R^1$ are independently selected from monovalent alkyl groups having 1 to 18 carbon atoms, which may have ether linkages between carbon atoms and may further comprise halogen.

In one embodiment, where a silicone hydrogel ophthalmic lens is desired, the ophthalmic lens of the present invention will be made from a reactive mixture comprising at least approximately 20 and preferably between approximately 20 and 70 percent weight silicone-containing components based on total weight of reactive monomer components from which the polymer is made.

In another embodiment, one to four $R^1$ comprises a vinyl carbonate or carbamate of Formula II

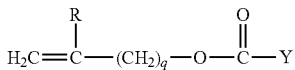

wherein Y denotes O—, S— or NH—; and R denotes hydrogen or methyl; d is 1, 2, 3, or 4; and q is 0 or 1.

The silicone-containing vinyl carbonate or vinyl carbamate monomers specifically include 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

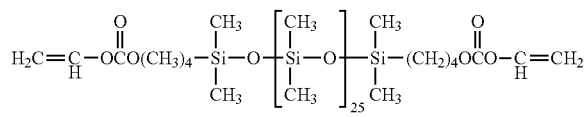

Where biomedical devices with modulus below approximately 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

(\*D\*A\*D\*G)$_a$\*D\*D\*E$^1$; E
(\*D\*G\*D\*A)$_a$\*D\*G\*D\*E$^1$ or;
E(\*D\*A\*D\*G)$_a$\*D\*A\*D\*E$^1$       Formulae IV-VI wherein D denotes an alkyl diradical, an alkyl cycloalkyl diradical, a cycloalkyl diradical, an aryl diradical, or an alkylaryl diradical having 6 to 30 carbon atoms;

wherein G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\*denotes a urethane or ureido linkage; a is at least 1; and A denotes a divalent polymeric radical of formula:

Formula VII wherein $R^{11}$ independently denotes an alkyl or fluoro-substituted alkyl group having 1 to 10

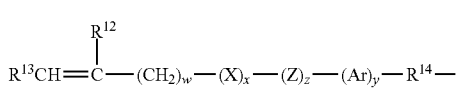

carbon atoms, which may contain ether linkages between carbon atoms; y is at least 1; and p provides a moiety weight of 400 to 10,000; each of E and $E^1$ independently denotes a polymerizable unsaturated organic radical represented by Formula VIII wherein $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by Formula IX (the full structure may be understood by joining corresponding asterisk regions, \* to \*, \*\* to \*\*)

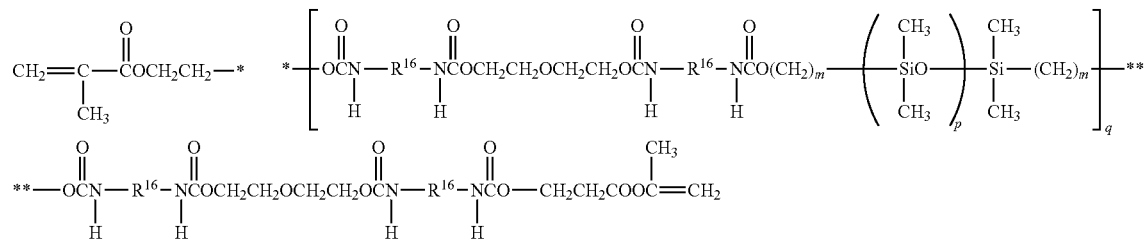

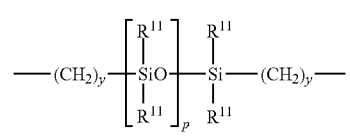

wherein $R^{16}$ is a diradical of a diisocyanate after removal of the isocyanate group, such as the diradical of isophorone diisocyanate. Another suitable silicone-containing macromer is a compound of formula X (in which x+y is a number in the range of 10 to 30) formed by the reaction of fluoroether, hydroxy-terminated polydimethylsiloxane, isophorone diisocyanate and isocyanatoethylmethacrylate. Formula X (the full structure may be understood by joining corresponding asterisk regions, \* to \*)

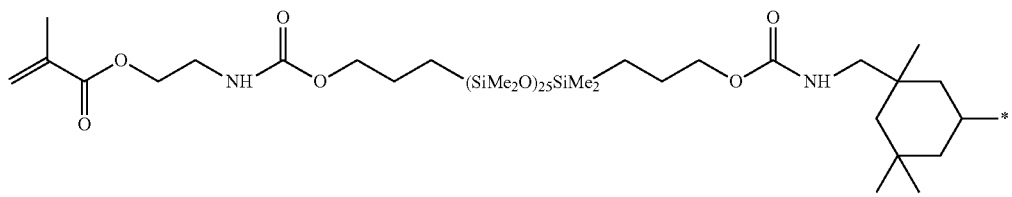

-continued

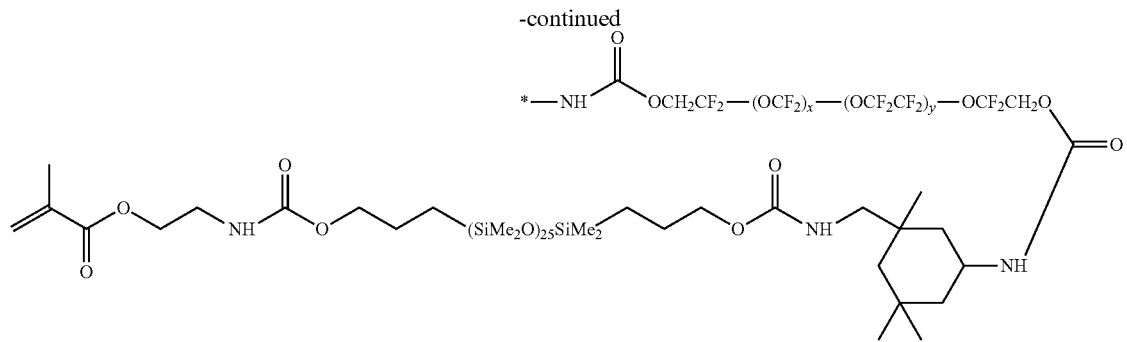

Other silicone-containing components suitable for use in this invention include macromers containing polysiloxane, polyalkylene ether, diisocyanate, polyfluorinated hydrocarbon, polyfluorinated ether, and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Figure 3:
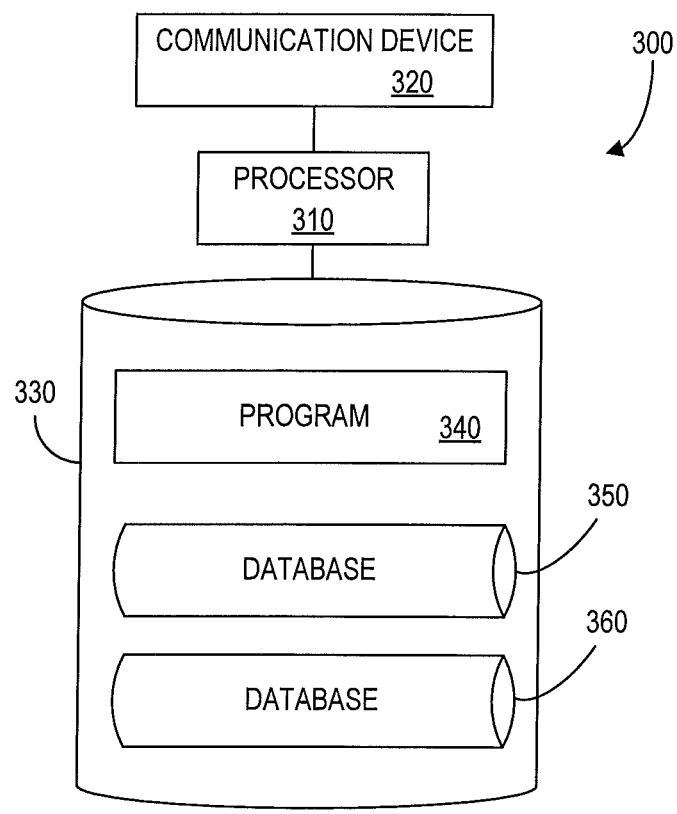
FIG. 3 illustrates a schematic design of a processor that may be used to implement at least some steps of the methods of the present disclosure.

Referring now to FIG. 3, a schematic design of a processor that may be used to implement at least some steps of the methods of the present disclosure is depicted. The controller 300 can include one or more processors 310, which may include one or more processor components coupled to a communication device 320. In some embodiments, a controller 300 can be used to transmit energy to the energy source placed in the ophthalmic lens 100, 209.

The processors 310 can be coupled to a communication device configured to communicate energy via a communication channel. The communication device may be used to electronically communicate with components within the media insert, for example. The communication device 320 may also be used to communicate, for example, with one or more controller apparatus or programming/interface device components.

The processor 310 is also in communication with a storage device 330. The storage device 330 may comprise any appropriate information storage device, including combinations of magnetic storage devices, optical storage devices, and/or semiconductor memory devices such as Random Access Memory (RAM) devices and Read Only Memory (ROM) devices.

The storage device 330 can store a program 340 for controlling the processor 310. The processor 310 performs instructions of a software program 340, and thereby operates in accordance with the present invention. For example, the processor 310 may receive information descriptive of media insert placement, electronic component(s) placement, and the like. The storage device 330 can also store ophthalmic related data in one or more databases 350 and 360. The database may include, for example, measurement thresholds, metrology data, and specific control sequences for controlling energy to and from a media insert. The database may also include parameters and controlling algorithms for the control of the system(s) that may reside in the ophthalmic device as well as data and/or measured feedback that can result from their action. In some embodiments, that data may be ultimately communicated to/from an external reception device.

Figure 4:
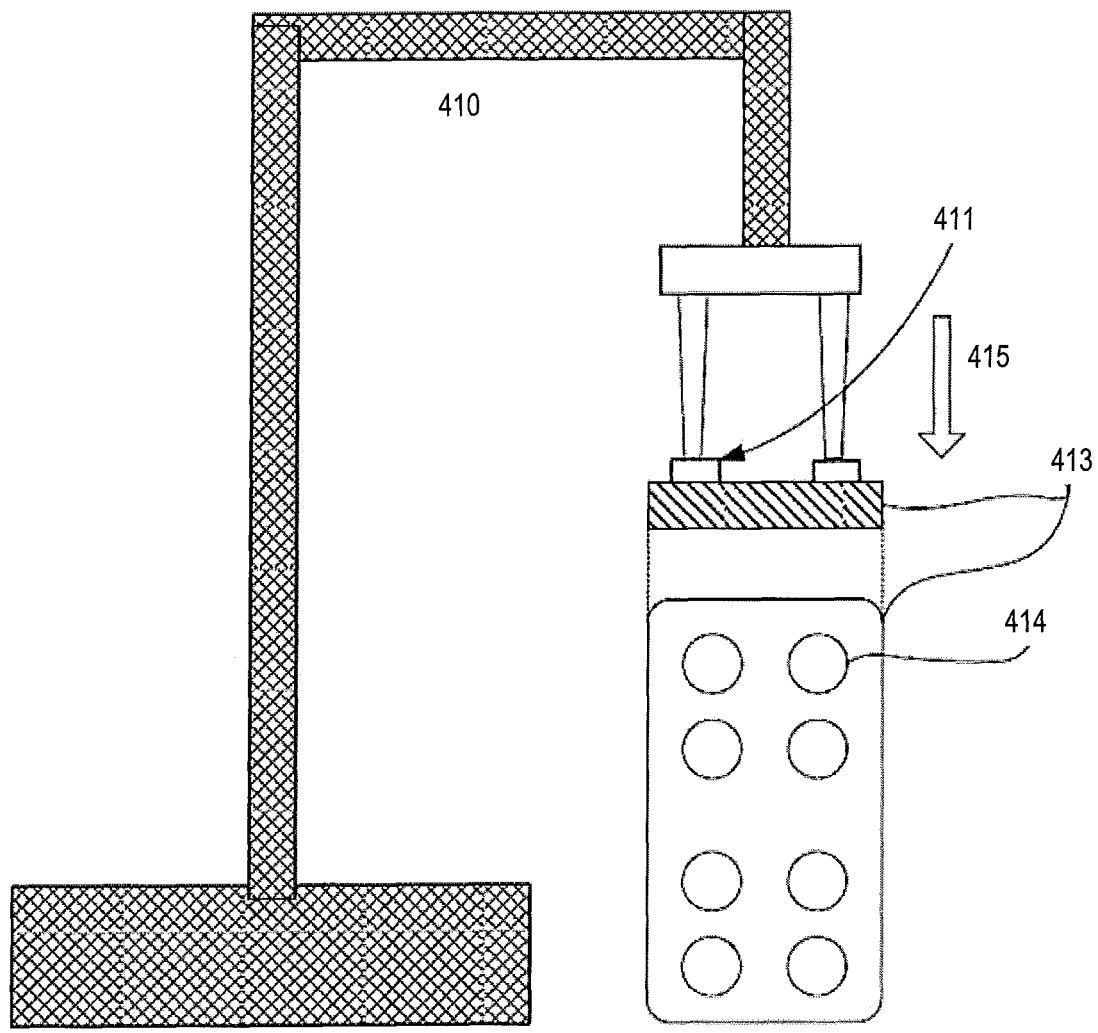
FIG. 4 illustrates an example of apparatus components for placing a media insert into an ophthalmic lens mold part according to some aspects of the present disclosure.

Referring now to FIG. 4, an example of apparatus components for placing a media insert and/or electronic component(s) onto an ophthalmic lens mold piece according to some aspects of the present disclosure are depicted. In particular, an automated apparatus 410 is illustrated with one or more insert 414 transfer interfaces 411. As illustrated, multiple mold piece(s), each with an associated insert 414, can be contained on a pallet 412 and presented to a media transfer interface 411. Embodiments can include a single interface individually placing rigid inserts 414 or multiple interfaces (not shown) simultaneously placing Rigid Inserts 414 in multiple mold parts, and in some embodiments, in each mold piece.

Another aspect of some embodiments includes apparatus to support the rigid insert 414, e.g. holding points, while the body of the ophthalmic lens is molded around the media insert and/or electronic components. The holding points may be affixed with polymerized material of the same type that will be formed into the ophthalmic lens body.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention. It may be obvious to one skilled in the art that additional embodiments may be practical, and such methods are well within the scope of the claims.

Figure 5:
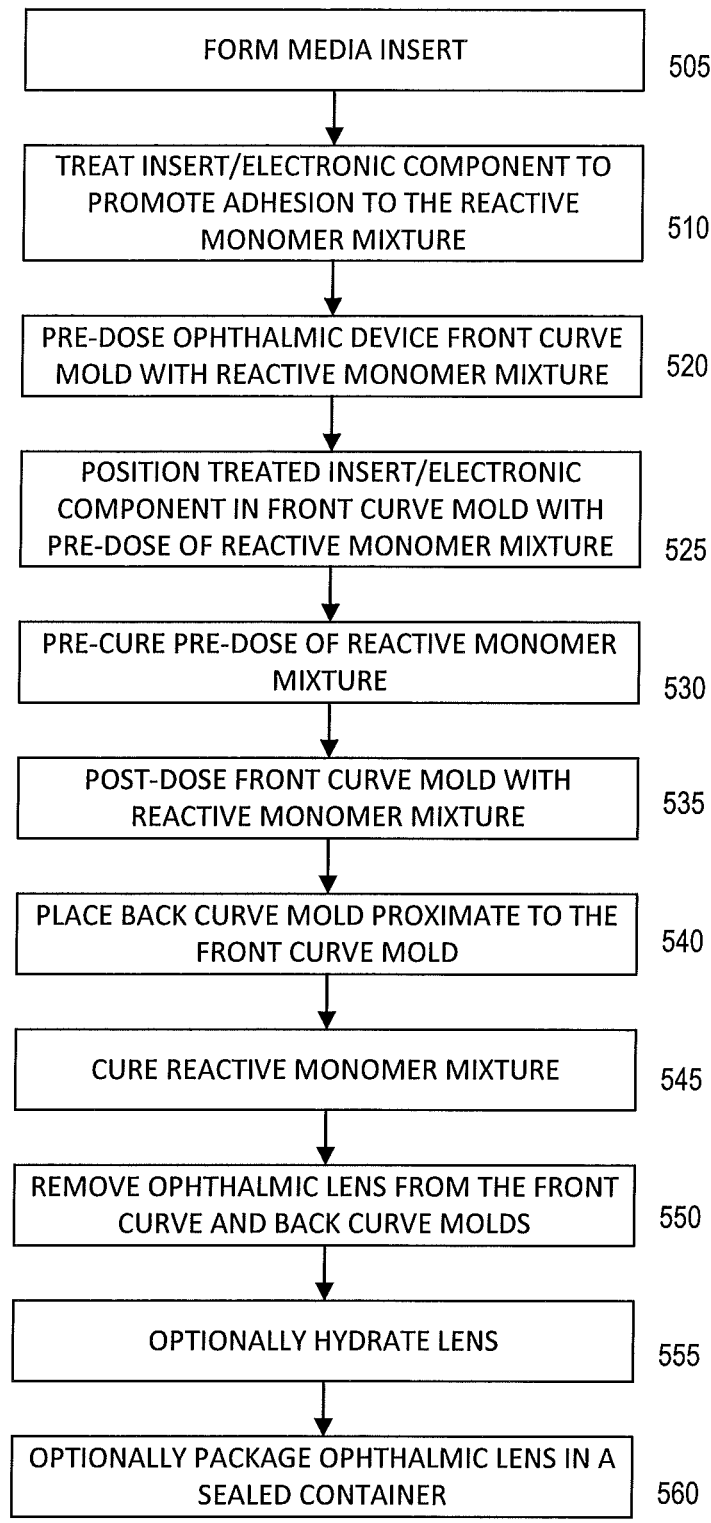
FIG. 5 illustrates method steps for forming an ophthalmic device according to some aspects of the present disclosure.

Referring now to FIG. 5, method steps for forming an ophthalmic device according to some aspects of the present disclosure are illustrated in a flowchart. Beginning the description at step 505, a media insert capable of correcting specific astigmatic characteristics of an eye may be formed. The media insert may include energization elements and/or functional electronic components that may be formed in a Stacked Integrated component Device(s) configuration to permit a generally arcuate shape that can reside on the anterior surface of an eye. Although the shape may allow for the media insert to reside directly on the surface of an eye, in some embodiments it may be preferred that the media insert be coated with a biocompatible coating and/or biocompatible hydrogel according to aspects of the disclosure.

Figure 6:
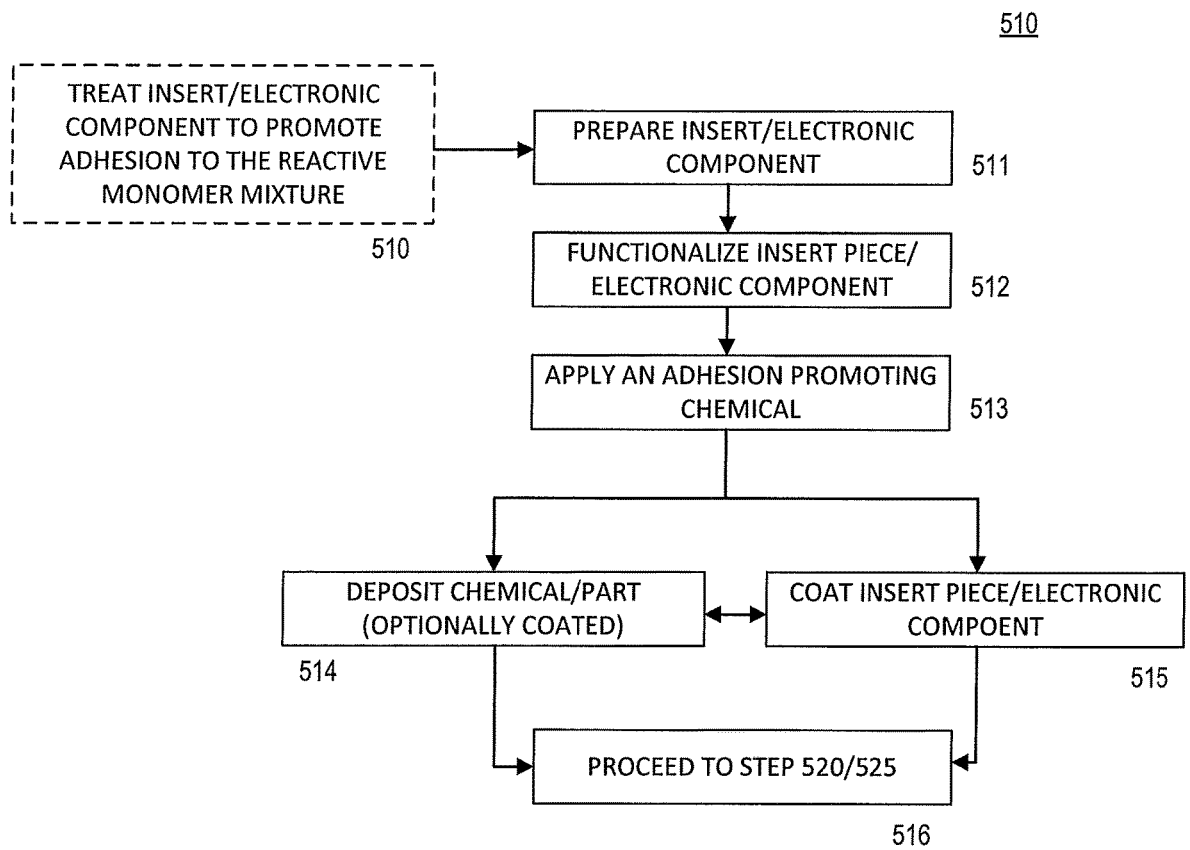
FIG. 6 illustrates method steps for treating a media insert/electronic components and promote adhesion of a hydrogel portion of the ophthalmic device according to aspects of the present disclosure.

At step 510, the media insert may be treated to increase the adhesive tendencies of the media insert surface(s) and/or electronic component(s) to the encapsulating reactive monomer mixture. Methods that may be implemented to treat and increase adhesion surface properties include method steps illustrated in FIG. 6. In particular, the method steps which may promote adhesion of a hydrogel to at least a surface of the media insert and/or electronic components. At step 511, the media insert and/or electronic component can be prepared. Preparation of the media insert and/or electronic component can include cleaning the parts by soaking them into a solvent, for example. Other ways of cleaning them may additionally or alternatively include blowing air to the part to remove contaminants such as dust.

Once the media insert and/or electronic component have been cleaned at step 511, at step 512 the parts may be functionalized. The functionalization process can be achieved in several ways including, for example, by exposing the parts to a plasma treatment in an oxygen or argon atmosphere. In some embodiments, high intensity RF and high vacuum pressure of about 400-800 mTorr may also be used as part of the plasma treatment. The oxygen plasma can clean and functionalize the surfaces by reacting with molecules on the surface of the substrate and breaking those molecules down so that they may become volatile. The argon plasma may not be reactive like the oxygen plasma but the relatively heavy argon ions can provide a "micro-sandblasting" like effect when they hit the surface. Moreover, the plasma treatment may create oxygen species (e.g., carbonyls, hydroxyl groups, carboxylic groups, carboxylic acids) in the plastic polymer chain that an adhesion promoting chemical can bind to. Similarly, in addition or alternatively, the functionalization process can be achieved using an ozone treatment. In some embodiments, yet another treatment/method may include utilizing UV light with chemicals like benzophenone to crosslink the surface(s) of the part(s) to the hydrogel.

Once the parts are functionalized, at step 513, an adhesion promoting chemical can be applied to act as an adhesion promoter. The functionalized parts may be reacted with a chemical, in some embodiments under a vacuum for a pre-determined period of time (e.g., as long as several hours). Chemicals may include but are not limited to a silane, such as a methoxy-silane. Some specific examples can include a vinyldimethylethoxysilane, methacryloxypropyldimethyl—methoxysilane, ((Chloromethyl)phenylethyl)-trimetoxysilane, styrylethyltrimethoxysilane, or vinylmethoxysiloxane homopolymer.

At step 514, the part may be deposited for a biocompatible hydrogel to bind with the adhesion promoter and/or encapsulate the parts. However, the parts may be encapsulated, for example, with a parylene or another hydrogel, at step 515, before and/or after it is deposited on a mold piece. Following at 516, the ophthalmic device may be formed as explained further in steps 520/525-560. Accordingly, referring back to FIG. 5 at step 520 the front curve mold may be pre-dosed with a reactive monomer mixture. The predose amount and location may be optimized to ensure that the resulting ophthalmic lens properly encapsulates the media insert and/or electronic component. For example, too little pre-dose RMM may prevent a full encapsulation, and too much pre-dose RMM may cause the formation of bubbles within the lens-forming cavity. In some preferable embodiments, the pre-dose amount may be approximately 10 uL of RMM. Similarly, the placement of the pre-dose in relation to the media insert may reduce encapsulation issues. For example, placement of the pre-dose on the front curve mold may coincide with the steepest concave point on the Rigid Insert.

In some embodiments, the molding steps 515-545 may occur in a nitrogen-rich environment, preferably with oxygen content between 0.0% and 0.5%. Accordingly, the components utilized throughout the process may be equilibrated to the environment prior to use.

At step 525, the media insert and/or electronic component(s) may be placed proximate to the front curve mold and in contact with the pre-dosed RMM. In some embodiments, the media insert may be aligned proximate to the front curve mold prior to the pre-dose at 520. In such embodiments, the media insert may be nested into the front curve mold after the pre-dosing step at 520. In embodiments where Stabilizing Features are included with the media insert, the placement of the media insert may not require specific alignment on the front curve mold. In alternative embodiments where the stabilizing features and media insert are separately included in the ophthalmic lens, specific alignment between the media insert and the front curve mold can be required.

Further, the media insert and/or electronic element(s) may preferably be placed via mechanical placement. Mechanical placement may include, for example, a robot or other automation, such as, for example, those known in the industry to place surface mount components or a pick and place automated apparatus. Human placement of a rigid insert is also within the scope of the present invention. Accordingly, mechanical placement may be effective where it places the media insert and/or electronic component within a mold part such that the polymerization of a reactive mixture contained by the mold part may include the media insert and/or electronic component in a resultant ophthalmic lens.

In some embodiments, at step 530, the RMM may be pre-cured to secure the rigid insert and/or electronic element(s) for the remaining encapsulation process. For example, the front curve assembly may be pre-cured under a blue cure lamp at 5 mW for 2 minutes at an ambient temperature, such as 22° C. In some embodiments, pre-curing may occur before the media insert and/or electronic component is placed at step 525.

At step 535, the front curve assembly may be post-dosed with the remaining RMM that may be necessary to fully encapsulate the media insert and/or electronic component and create an ophthalmic lens. At step 540, the back curve mold piece may be placed proximate to the front curve mold piece thereby forming a mold assembly having a lens forming cavity between the back curve mold piece and the front curve mold piece. The lens-forming cavity may define the shape of the ophthalmic lens, and the RMM may fully encapsulate the media insert and/or electronic component(s) within the cavity.

At step 545, the front and back curve mold pieces forming the mold assembly may be fully cured. As a consequence, the reactive monomer mixture within the cavity may be polymerized. Polymerization may be accomplished, for example, via exposure to one or both of actinic radiation and heat. The parameters of the curing process may be defined by the specific chemistry of the RMM and the media insert and/or electronic component(s). For example, exposure to radiation may cure the RMM, but the radiation may degrade or affect the integrity of the media insert and/or electronic component(s). In some embodiments, the cure time may be extended to allow for tolerable curing conditions.

At 550, the ophthalmic lens with the media insert and/or electronic component may be removed from the front and back curve mold pieces after the mold pieces are disassembled. After disassembling, for example, the ophthalmic lens may remain attached to either the front curve mold piece or the back curve mold piece to then be Released from the mold. In some embodiments, the mold part wherein the ophthalmic lens can remain may be manipulated to release the ophthalmic lens. The manipulation may include, for example, bending the mold part, and may allow for easier removal of the ophthalmic lens, agitation, submersion in a controlled solution, and/or similar techniques.

At step 555, the ophthalmic lens may be hydrated. The hydration process at 555 may allow the ophthalmic lens to be compatible with an eye, wherein the functionality of the ophthalmic lens including the media insert and/or electronic component(s) may depend on said compatibility. In some embodiments, the hydration process may comprise multiple stages to ensure proper swelling of the ophthalmic lens. For example, the first stage may include soaking the ophthalmic lens in a solution with around 0.45% sodium borate at 50° C. for one hour. The second stage may repeat the conditions of the first stage with fresh solution. The third and final stage may include soaking the ophthalmic lens in a solution at room temperature.

At step 560, the ophthalmic lens may be packaged in a sealed container. The sealed container may prevent exposure to air and may include a solution to prevent drying of the ophthalmic lens before use.

The preferred ophthalmic lenses of the invention are soft contact lenses with its hydrogel portion having water contents of approximately 0 to 90 percent. More preferably, the ophthalmic lenses can include monomers containing either or both hydroxy groups and carboxyl groups, or be made from silicone-containing polymers, such as siloxanes, hydrogels, silicone hydrogels, and combinations thereof. Material(s) useful for forming the ophthalmic lenses of the invention may be made by reacting blends of macromers, monomers, and combinations thereof along with additives such as polymerization initiators. Suitable materials include, without limitation, silicone hydrogels made from silicone macromers and hydrophilic monomers.

The invention claimed is:

1. A method of forming an energized ophthalmic device, the method comprising:
    pre-dosing a first mold part with a pre-dose amount of a reactive monomer mixture;
    functionalizing a media insert so that an adhesion promoter can bind to a surface of said media insert, the media insert being a separate component configured to mount and encapsulate at least one electronic component;
    applying an adhesion promoter to the functionalized media insert;
    coating said media insert including the adhesion promoter;
    placing the media insert on said pre-dose of reactive monomer mixture;
    pre-curing the pre-dosed reactive monomer mixture to fixedly hold the media insert proximate to the first mold part;
    post-dosing the first mold part with a post-dose of a reactive monomer mixture;
    placing a second mold part proximate to the first mold part, wherein the placing forms an ophthalmic device mold assembly with a lens forming cavity in which the media insert is encapsulated; and
    curing at least the post-dosed reactive monomer mixture to form the energized ophthalmic lens.

2. The method of claim 1, wherein the functionalizing step includes providing a plasma treatment in an oxygen environment.

3. The method of claim 1, wherein the functionalizing step includes exposing the media insert to an ozone environment.

4. The method of claim 1, wherein the functionalizing step includes crosslinking a chemical with the media insert.

5. The method of claim 4, wherein the functionalizing step further includes exposing the media insert to a radiation to crosslink said chemical with the media insert.

6. The method of claim 1, wherein the adhesion promoter includes a methoxy-silane chemical.

7. The method of claim 6, wherein the methoxy-silane can include one of more of a vinyldimethylethoxysilane, a methoxysilane, a trimethoxysilane, a styrylethyltrimethoxysilane, a bis(trimethoxysilyl)hexane, and a vinylmethoxysiloxane homopolymer.

8. The method of claim 1, wherein the coating is a parylene coating.

9. The method of claim 1, wherein the coating is a polymerizable hydrogel coating.

10. A method of forming an energized ophthalmic device, the method comprising:
    functionalizing a media insert so that an adhesion promoter can bind to a surface of said media insert, the media insert being a separate component configured to mount and encapsulate at least one electronic component;
    applying an adhesion promoter to the functionalized media insert;
    coating said media insert including the adhesion promoter with a parylene layer; and
    fixing said coated media insert in a hydrogel ophthalmic device.

11. The method of claim 10, additionally comprising:
    depositing coated energy source; and
    forming an electrical connection between said coated media insert and said deposited coated energy source.

* * * * *